(12) United States Patent  
Wang et al.

(10) Patent No.: US 9,904,322 B2
(45) Date of Patent: Feb. 27, 2018

(54) MASS STORAGE DEVICE

(71) Applicant: HEWLETT-PACKARD DEVELOPMENT COMPANY, L.P., Houston, TX (US)

(72) Inventors: Kevin Yun-Hsiang Wang, Taipei (TW); Shih-Jung Huang, Taipei (TW); Chen-Mu Chang, Taipei (TW); James Lo, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 14/786,276

(22) PCT Filed: May 31, 2013

(86) PCT No.: PCT/US2013/043579
§ 371 (c)(1),
(2) Date: Oct. 22, 2015

(87) PCT Pub. No.: WO2014/193404
PCT Pub. Date: Dec. 4, 2014

(65) Prior Publication Data
US 2016/0216733 A1 Jul. 28, 2016

(51) Int. Cl.
G06F 13/00 (2006.01)
G06F 1/16 (2006.01)
(Continued)

(52) U.S. Cl.
CPC .......... *G06F 1/1632* (2013.01); *G06F 1/1654* (2013.01); *G06F 11/3051* (2013.01);
(Continued)

(58) Field of Classification Search
None
See application file for complete search history.

(56) References Cited

U.S. PATENT DOCUMENTS 5,867,406 A * 2/1999 Yanagisawa .......... G06F 1/1616
361/679.32
5,873,000 A * 2/1999 Lin ..................... G06F 13/4081
710/72
(Continued)

FOREIGN PATENT DOCUMENTS

CN 1553356 12/2004
CN 101162434 4/2008
(Continued)

OTHER PUBLICATIONS

"How Can I Be Notified Any Time a Network Cable Gets Unplugged?" by ScriptingGuy1. Microsoft TechNet forum. Mar. 21, 2005. Available at: https://blogs.technet.microsoft.com/heyscriptingguy/2005/03/21/how-can-i-be-notified-any-time-a-network-cable-gets-unplugged/.*
(Continued)

*Primary Examiner* — Michael Sun
(74) *Attorney, Agent, or Firm* — HP Inc. Patent Department

(57) ABSTRACT

Activation of a release button is detected, where the release button is to separate a tablet computing device from a docking station while a mass storage device of the docking station is performing an operation. In response to the detection, a warning message is generated.

15 Claims, 4 Drawing Sheets

(51) Int. Cl.
*G06F 11/30* (2006.01)
*G06F 11/32* (2006.01)
*G06F 13/40* (2006.01)
*G06F 13/42* (2006.01)

(52) U.S. Cl.
CPC ........ *G06F 11/327* (2013.01); *G06F 13/4081* (2013.01); *G06F 13/4282* (2013.01)

(56) References Cited

U.S. PATENT DOCUMENTS

| | | | |
|---|---|---|---|
| 7,386,868 | B2 | 6/2008 | McCormack |
| 8,310,490 | B2 | 11/2012 | Zaczek et al. |
| 2010/0173672 | A1 | 7/2010 | Kuhl |
| 2010/0332711 | A1* | 12/2010 | Li ........................ G06F 1/1632 710/303 |
| 2011/0096512 | A1* | 4/2011 | Klicpera ............ G06K 7/10881 361/747 |
| 2011/0162035 | A1* | 6/2011 | King .................... G06F 1/1632 726/1 |
| 2012/0311216 | A1* | 12/2012 | Chen .................. G06F 13/4027 710/303 |
| 2012/0330555 | A1* | 12/2012 | Shaanan ................ A61B 5/145 702/19 |
| 2015/0185774 | A1* | 7/2015 | Vroom .................. G06F 1/1632 248/544 |
| 2015/0234771 | A1* | 8/2015 | Wu ..................... G06F 13/4081 710/303 |
| 2016/0175711 | A1* | 6/2016 | Billington ............... G06F 3/016 463/38 |

FOREIGN PATENT DOCUMENTS

| | | |
|---|---|---|
| CN | 100487632 | 5/2009 |
| CN | 101589356 | 11/2009 |
| CN | 102117182 | 7/2011 |
| TW | M439836 | 10/2012 |
| TW | 201418947 A | 5/2014 |

OTHER PUBLICATIONS

Colin Dean, "Thermaltake BlacX Duet Hard Drive Docking Station Review," Dec. 8, 2009.

* cited by examiner

MASS STORAGE DEVICE

BACKGROUND

Portable computing systems come in different sizes, shapes, and features. Some portable computers are notebook configurations with a keyboard housing and a display housing connected by a hinge. Other portable computers are in a tablet configuration that uses a single touchscreen display and housing for accepting user input and displaying images to an operating user. Convertible notebook computers have an integrated keyboard that can be hidden by a swivel joint or a slide joint, exposing only the screen for touch operation. Hybrid computers have a detachable keyboard so that the touch screen can be used as a stand-alone tablet.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
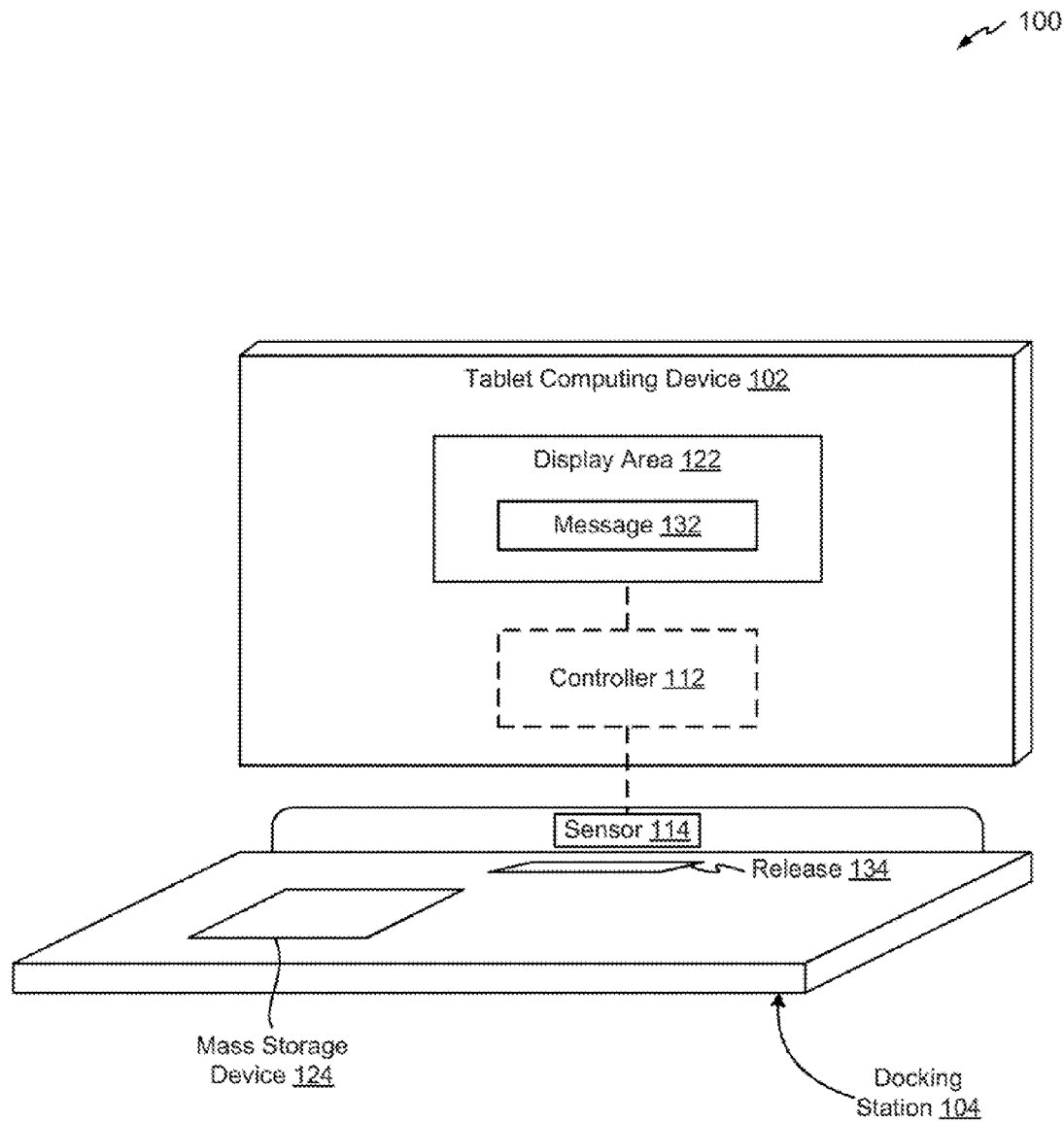
FIG. 1 is a block diagram of a computing system including a tablet computing device and a docking station, according to one example.

A hybrid notebook computer includes two parts, a tablet and a docking station. Fasteners can hold the tablet to the docking station. For example, the fasteners may be hooks that are engaged with detents in the tablet when the tablet is attached to the docking station. To detach the tablet from the docking station, the fasteners have to be released from the detents in the tablet. The release is to detach the fasteners (e.g., latch, hook, magnet, mount, and/or a locking mechanism to couple the tablet to the docking station) that hold the tablet to the docking station. The release may be, for example, a button or a slide switch.

The tablet is a personal computer that may be operated by a touchscreen, where the user's finger may function as the mouse and cursor, removing the need for a separate mouse. An onscreen, virtual keyboard may be displayed on the display, removing the need for a traditional keyboard.

The tablet is often thinner and lighter than a notebook computer that includes a keyboard at the base, because the tablet forgoes the physical keyboard. Thus, the tablet can be used holding the tablet with one or two hands and therefore may be thinner, lighter, and more mobile than a notebook computer. A notebook computer often includes a hard disk drive and a battery in the base of the notebook. However, a tablet may not include a hard disk drive due to the size of the hard disk drive, the power capacity of the battery in the tablet, or the weight of the hard disk drive. Instead, a tablet may use a solid state non-volatile memory such as a flash memory. Flash memory may be for example 32, 64, 128 or more gigabytes, but hard disk drives may be for example 1 terabyte or more and cost significantly less.

A docking station may provide the tablet with multiple peripherals and ports when the tablet is connected to the docking station. Moreover, the docking station enables computing system to function like a notebook when the tablet is connected to the docking station. Thus, the tablet may be compatible with a docking station that includes a keyboard. The keyboard enables the user to provide input for the tablet similar to that of a notebook or a desktop computer. To increase storage available to the tablet, a mass storage device such as a hard disk drive can be added to the docking station. The tablet may communicate with the mass storage device through an electrical, optical, or other physical connection. Accordingly, the tablet may access the mass storage device of the docking station to perform read and write operations, for example.

Sometimes, during such access operations, a user may detach the tablet from the docking station before completion of the access operation which may damage the mass storage device. For example, a read/write head of the mass storage device may be damaged if the read/write head is not properly parked or shut off when the tablet is separated from the docking station during the access operation.

Accordingly, examples disclosed herein address the above challenges by alerting the user of the danger of an improper undocking action if an access operation to the mass storage device is in progress and an action to undock the tablet from the docking station is initiated by the user.

In one example, a computing system includes a tablet computing device and a docking station to couple to the tablet computing device, where the docking station includes a mass storage device. The computing system includes a sensor to detect that a release is activated to separate the tablet computing device from the docking station while the mass storage device is performing an operation. The computing system includes a controller in the tablet computing device to generate a warning message in response to the detection.

In another example, a method includes detecting that a release of a docking station is activated to separate a tablet computing device from the docking station while a mass storage device of the docking station is performing an operation. The method also includes displaying a warning message to a user at a display area of the tablet computing device in response to the detection.

In another example, a non-transitory computer-readable storage medium includes instructions that, when executed by a controller in a tablet computing device, causes the controller to respond to a signal from a sensor indicating a release of a docking station is activated, where the release is to separate the tablet computing device from the docking station while the tablet computing device is accessing a mass storage device of the docking station. The instructions are executable to display a warning message to a user at a display area of the tablet computing device in response to the detection.

With reference to the figures, FIG. 1 is a block diagram of a computing system including a tablet computing device and a docking station, according to one example. A computing system 100 can include a tablet computing device 102 and a docking station 104.

Docking station 104 can removably connect to the tablet 102, for example, via a hinge (not shown). Thus, docking station 104 can include a release 134 to separate or to undock the tablet 102 from the docking station 104. Release 134 may be, for example, a button, a slide switch, or another type of release. In certain examples, release 134 can be located on the tablet 102 rather than on the docking station 104. Docking station 104 can include a sensor 114 to detect when the release 134 is activated to separate the tablet 102 from the docking station 104. In certain examples, the sensor 114 can be located on the tablet 102. Sensor 114 can be, for example, an activation sensor, an electrical sensor, a mechanical sensor, or another type of sensor.

Docking station 104 can include a mass storage device 124. Mass storage device 124 may provide large storage capacity for the computing system 101. Mass storage device 124 may include storage capacity that far exceeds the storage capacity available in the tablet 102. Mass storage device 124 may be, for example, a hard disk drive (HDD), a solid state drive (SDD), an optical drive, or another mass storage drive. Accordingly, tablet 102 can access the mass storage device 124 to provide additional storage capacity for the tablet 102. For example, controller 112 in the tablet 102 can control access to the mass storage device 124. Thus, tablet 102 may communicate with the mass storage device 124 through an electrical, optical, or other physical connection when the tablet 102 is coupled to the docking station 104. It should be noted that in some examples however, mass storage device 124 may be a second mass storage device of the computing system 100. In such examples, tablet 102 may also include a mass storage device.

Tablet 102 can include controller 112 and a display area 122. The display area 112 may be a touch screen for input to the tablet 102. Controller 112 is internal to the tablet 102 and is therefore shown in dotted lines. Controller 112 may be a general purpose processor for example. Controller 112 may communicate with the docking station 104 when the tablet 102 is connected to the docking station 104. Thus, controller 112 may control access of the tablet 102 to the mass storage device 124 and other devices (e.g., memory port, card reader, etc) of the docking station 104. For example, controller 112 may copy files to and from the mass storage device 124.

Further, controller 112 may detect when the release 134 of the docking station is activated to separate the tablet 102 from the docking station 104 while a read/write access operation is in progress. For example, sensor 114 may send a signal to the controller 112 when the release 134 is activated. If the controller 112 is accessing the mass storage device 124 of the docking station 104 when the release 134 is activated, controller 112 can cause a warning message 132 to be displayed to the user via the display area 122 of the tablet 102, to alert the user and to prevent potential damage to the mass storage device 124, a system failure, and data loss. In some examples, the warning message 132 may be another type of warning message such as an audible feedback such as an error associated sound or haptic feedback, or an error associated light. Moreover, in response to the detection, controller 112 can abort the access operation to prevent damage, failure, or data loss.

Figure 2:
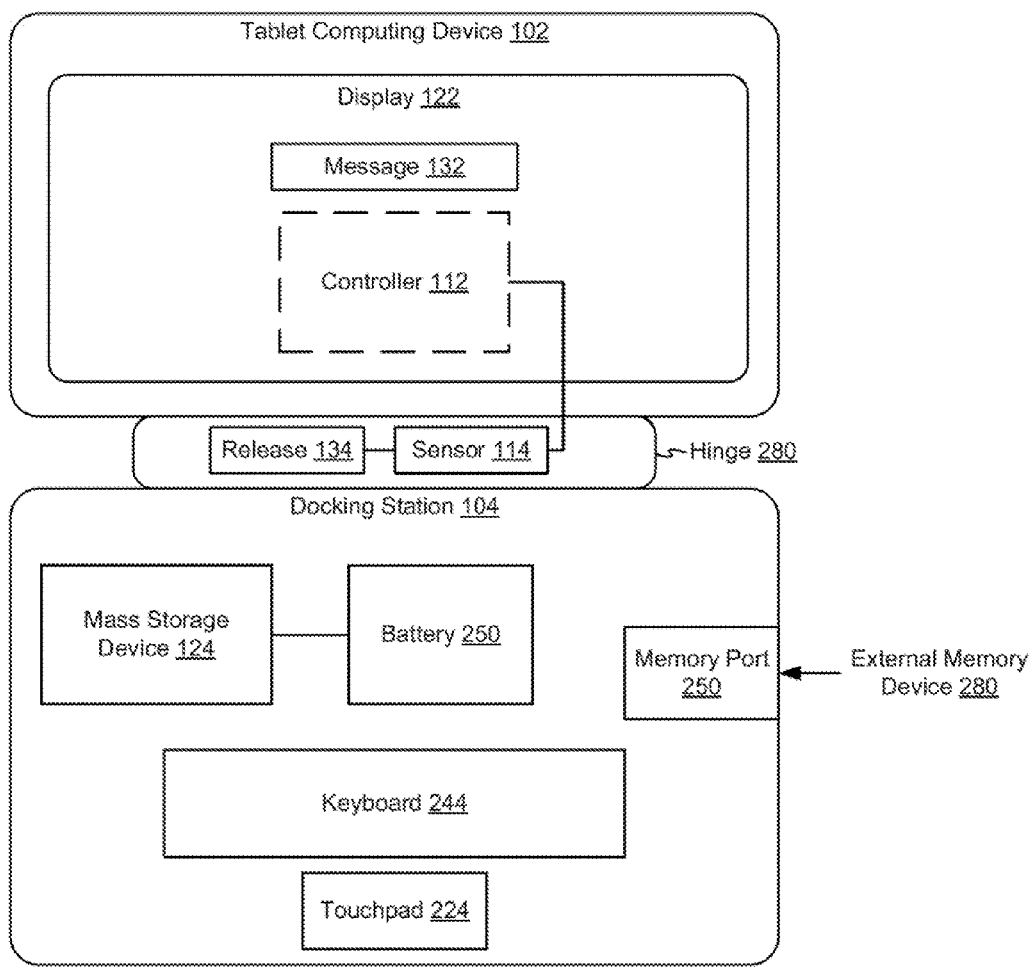
FIG. 2 is a block diagram of a computing system including a tablet computing device and a docking station, according to one example.

FIG. 2 is a block diagram of a computing system including a tablet computing device and a docking station, according to one example. The docking station 104 can include a hinge 280 to allow the tablet 102 to pivot relative to the docking station 104 if the tablet 102 is connected to the docking station 104. The hinge 280 can include the release 134 and the sensor 114. In some examples, the release 134 and the sensor 114 are a single device, where the release 134 includes the sensor 114. The release 134 may be, for example, a button, a slide switch or another type of release. The sensor 114 may be, for example, an activation sensor. The sensor 114 may send a signal to the controller 112 of the tablet 102 when the release 134 is activated to uncouple the tablet 102 from the docking station.

If the mass storage device 124 is performing a task when the release 134 is activated, controller 112 can cause the message 132 to be displayed to the user at the display 122 of the tablet 102. In some examples, the message 132 may be a sound or a light display. The message 132 is to alert the user of potential issues that may arise when the tablet 102 is separated from the docking station 104 when the mass storage device 124 is performing an operation. For example, the message 132 is to prevent at least one of damage to the mass storage device 124, system failure, and data loss.

In certain examples, controller 112 may issue a command for a battery 250 of the docking station 104 to maintain power to the mass storage device 124 to safely shut down and/or safely park a read/write circuit or component of the mass storage device 124 to prevent damage to the mass storage device 124.

Docking station 104 can include a keyboard 244 and a touchpad 224. Docking station 104 may include other input devices other than the keyboard 244 and the touchpad 224. For example, docking station 104 may include a point of sale feature for scanning credit cards and may not include a physical keyboard. Keyboard 244 may be a "QUERTY" keyboard or another type of keyboard.

Docking station 104 may include additional ports, storage, or another component usable by the tablet 102 when docked to the docking station 104. For example, docking station may include a memory port 250 (e.g., USB port, SD card port) for receiving an external memory device 280. In such examples, controller 112 may also cause the message 132 to be displayed to the user when an access operation to the external memory device 280 is in progress and the release 134 is activated to separate the tablet 102 from the docking station 104, to prevent damage, system failure, or data loss. Further, docking station 104 may include other components or features such as a card reader for reading ID card or another type of card reader.

The tablet computing device 102 can include a non-volatile memory (not shown) such as a flash memory (e.g., 32, 64, 128 or more gigabytes). However, tablet 102 may also include a mass storage device. Further tablet 102 may include a USB port, an HDMI port, or another type of port.

Figure 3:
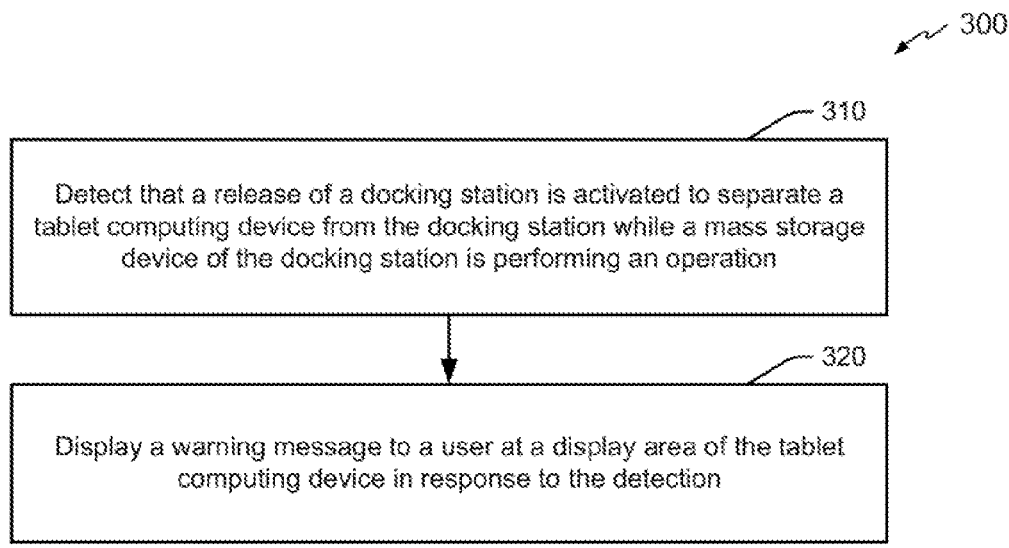
FIG. 3 is a flowchart of a method for displaying a warning message to a user, according to one example.

FIG. 3 is a flowchart of a method for displaying a warning message to a user, according to one example. Method 300 may be implemented in the form of executable instructions stored on a non-transitory computer-readable storage medium and/or in the form of electronic circuitry.

Method 300 includes detecting that a release of a docking station is activated to separate a tablet computing device from the docking station while a mass storage device of the docking station is performing an operation, at 310. Method 300 also includes displaying a warning message to a user at a display area of the tablet computing device in response to the detection, at 320. For example, sensor 114 may detect that the release 134 of the docking station 104 is activated and may send a signal to the controller 112 of the tablet. If the mass storage device 124 is being accessed, the controller 112 may cause message 132 to the displayed to the user at the display 122 of the tablet. The message 132 is to advise the user not to detach the tablet 102 from the docking station 104 until the access is completed.

Figure 4:
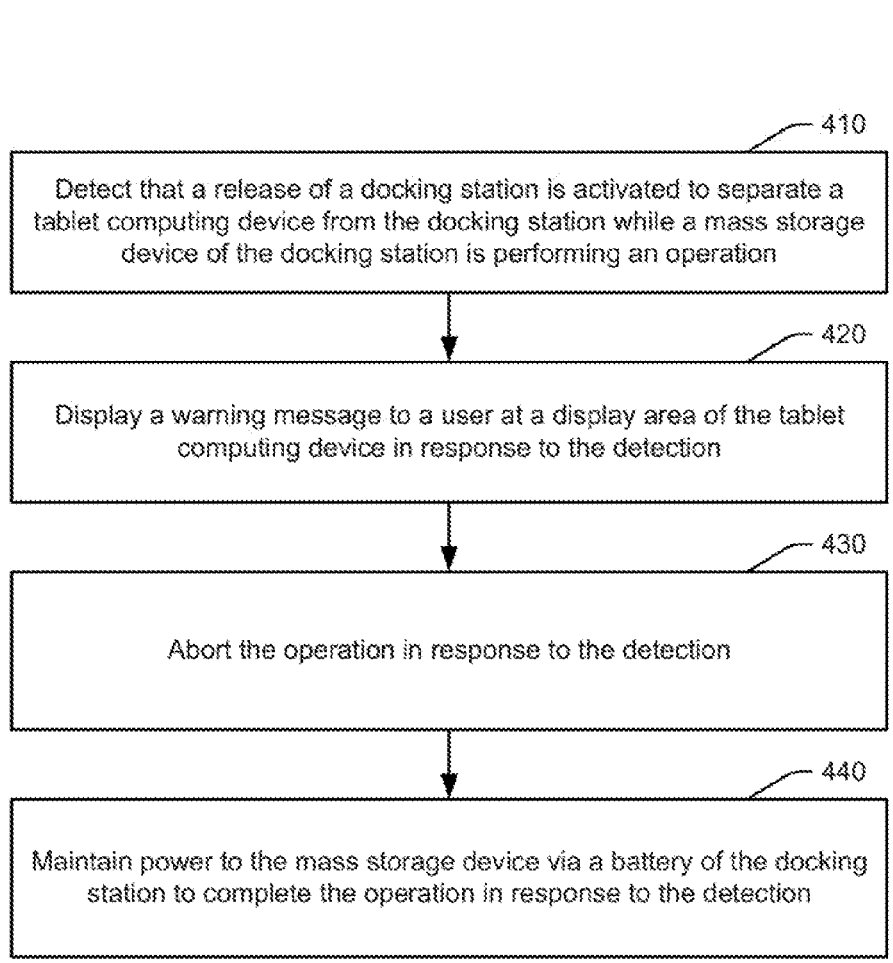
FIG. 4 is a flowchart of a method for displaying a warning message to a user, according to one example.

FIG. 4 is a flowchart of a method of displaying a warning message to a user, according to one example. Method 400 may be implemented in the form of executable instructions stored on a non-transitory computer-readable storage medium and/or in the form of electronic circuitry.

Method 400 includes detecting that a release of a docking station is activated to separate a tablet computing device from the docking station while a mass storage device of the docking station is performing an operation, at 410. For example, sensor 114 may detect that the release 134 is activated to separate the tablet 102 from the docking station 104 while the mass storage device 124 is performing at least one of a read access and a write access.

Method 400 includes displaying a warning message to a user at a display area of the tablet computing device in response to the detection, at 420. For example, controller 112 may cause message 132 to the displayed to the user at the display 122 of the tablet if the mass storage device 124 is performing the read/write access and the release 134 is activated.

Method 400 includes aborting the operation in response to the detection, at 430. For example, controller 112 may safely abort the read/write access to prevent damage to the mass storage device 124. Method 400 may also include maintaining power to the mass storage device via a battery of the docking station to complete the operation in response to the detection. For example, controller 112 may issue a command for the battery 250 of the docking station to provide power to the mass storage device 124 for a period of time (e.g., 20 to 30 seconds) to complete the operation and/or to safely shut down the mass storage device 124.

Figure 5:
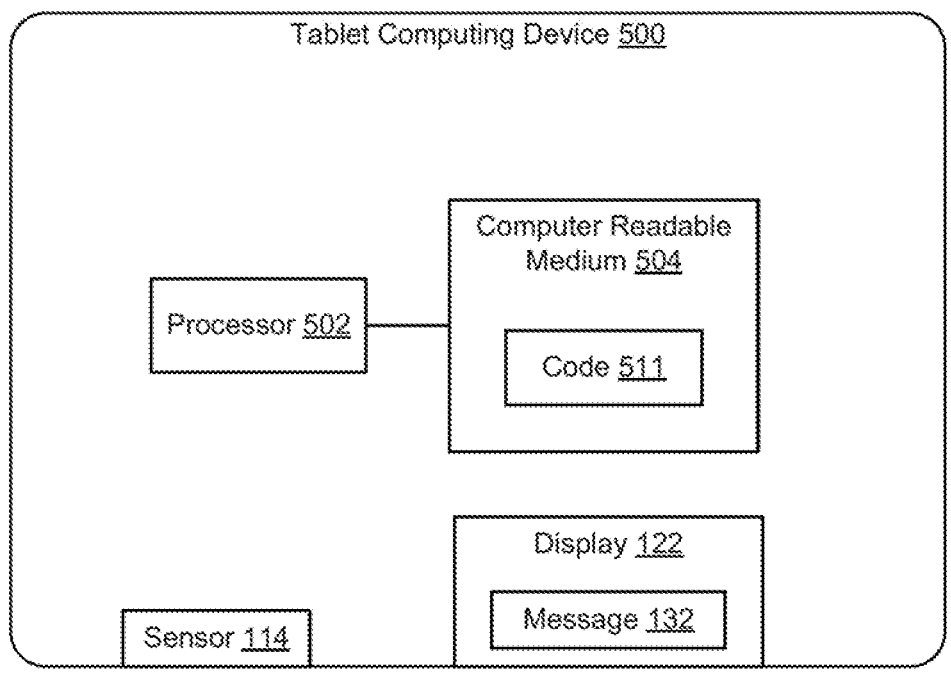
FIG. 5 is a block diagram of a tablet computing device including a computer-readable medium, according to one example.

FIG. 5 is a block diagram of a tablet computing device including a computer-readable medium, according to one example. Tablet 500 can include a non-transitory computer-readable medium 504. The non-transitory computer-readable medium can include code 511 that if executed by a processor 502 can cause the processor 502 to display a message 132 in a display area 122 when the tablet 500 is separated from the docking station during an operation of the mass storage device 124. To generate the message 132, the processor 502 can detect that the release 134 is activated to separate the tablet 102 from the docking station 500 while a read/write operation to the mass storage device 124 is in progress, using the sensor 114. Accordingly, damage to the mass storage device 124 may be prevented if the user is alerted.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations therefrom. It is intended that the appended claims cover such modifications and variations as fall within the true spirit and scope of the invention.

What is claimed is:

1. A computing system comprising:
    a tablet computing device;
    a docking station to couple to the tablet computing device, wherein the docking station comprises a mass storage device;
    a sensor to detect that a release is activated to separate the tablet computing device from the docking station while the mass storage device is performing an operation; and
    a controller in the tablet computing device to generate a haptic feedback warning message in response to the detection.

2. The computing system of claim 1, wherein the operation comprises at least one of a read operation and a write operation.

3. The computing system of claim 1, wherein the warning message indicates to a user that the mass storage may be damaged if the tablet computing device is separated from the docking station while the mass storage device is performing the operation.

4. The computing system of claim 1, wherein the sensor comprises an activation sensor, and wherein the activation sensor comprises at least one of an electrical sensor and a mechanical sensor.

5. The computing system of claim 1, further comprising a hinge to allow the tablet computing device to pivot relative to the docking station if the tablet computing device is connected to the docking station, wherein the hinge includes the release and the sensor.

6. The computing device of claim 1, the controller further to abort the operation in response to the detection.

7. The computing device of claim 1, the controller further to cause power to be maintained to the mass storage device via a battery of the docking station to complete the operation in response to the detection.

8. The computing system of claim 1, wherein the docking station comprises an input area for the tablet computing device, wherein the input area comprises at least one of a keyboard and a touchpad.

9. The computing device of claim 1, wherein the docking station further comprises at least one memory port for connecting at least one external memory device, wherein the controller is further to display a second warning message at the display area of the tablet computing device in response to detecting that the release is activated while the tablet computing device is accessing the at least one external memory device.

10. A method comprising:
    detecting that a release of a docking station is activated to separate a tablet computing device from the docking station while a mass storage device of the docking station is performing an operation; and
    generating a haptic feedback warning message to a user of the tablet computing device in response to the detection.

11. The method of claim 10, wherein the warning message is to inform the user of a potential damage to the mass storage device if the tablet device is separated from the docking station before completion of the operation, wherein the operation includes at least one of a read operation and a write operation.

12. The method of claim 10, further comprising aborting the operation in response to the detection.

13. The method of claim 10, further comprising maintaining power to the mass storage device via a battery of the docking station to complete the operation in response to the detection.

14. A non-transitory computer-readable storage medium comprising instructions that, when executed by a controller in a tablet computing device, causes the controller to:
respond to a signal from a sensor indicating a release of a docking station is activated, wherein the release is to separate the tablet computing device from the docking station while the tablet computing device is accessing a mass storage device of the docking station; and
generate a haptic feedback warning message to a user of the tablet computing device in response to the detection.

15. The non-transitory computer-readable storage medium of claim 14, wherein the access includes at least one of a read access and a write access, and wherein the docking station includes a keyboard.

\* \* \* \* \*